US012638902B2

(12) United States Patent
Li

(10) Patent No.: US 12,638,902 B2
(45) Date of Patent: May 26, 2026

(54) DATA CENTER POWER MANAGEMENT WITH POWER SAVING MODE

(71) Applicant: QUANTA COMPUTER INC., Taoyuan City (TW)

(72) Inventor: Yung-Fu Li, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 168 days.

(21) Appl. No.: 18/421,652

(22) Filed: Jan. 24, 2024

(65) Prior Publication Data

US 2025/0238067 A1     Jul. 24, 2025

(51) Int. Cl.
*G06F 1/3231* (2019.01)
(52) U.S. Cl.
CPC .................................. *G06F 1/3231* (2013.01)
(58) Field of Classification Search
CPC .... G06F 1/3215; G06F 1/3265; G06F 1/3212; G06F 1/3287; G06F 1/3206; G06F 1/3231
See application file for complete search history.

(56) References Cited

U.S. PATENT DOCUMENTS

| | | | | |
|---|---|---|---|---|
| 6,775,588 B1* | 8/2004 | Peck | .................... | B65G 1/1373 |
| | | | | 700/214 |
| 7,295,119 B2* | 11/2007 | Rappaport | ............ | H04W 12/12 |
| | | | | 705/28 |
| 2012/0280793 A1* | 11/2012 | Fayfield | ................ | G08G 1/142 |
| | | | | 340/8.1 |
| 2020/0363786 A1* | 11/2020 | Hsu | .......................... | G06F 1/20 |

* cited by examiner

*Primary Examiner* — Raymond N Phan
(74) *Attorney, Agent, or Firm* — NIXON PEABODY LLP

(57) ABSTRACT

A computing system is controllable to move into and out of a power saving mode based on the detected proximity of a user. When a user is not within a proximate zone of the computing system, the computing system can enter a power saving mode in which the various indicators of the computing system can be temporarily disabled. When a user is detected within the proximate zone, the computing device can exit the power saving mode, allowing its various indicators to operate as usual. Thus, while a user is sufficiently proximate to a computing system to receive information from its indicators, the computing system may operate its indicators as usual, but when the user is no longer proximate to the computing system, the computing system can disable its indicators to preserve power. Such control can be effected by a baseboard management controller.

22 Claims, 4 Drawing Sheets

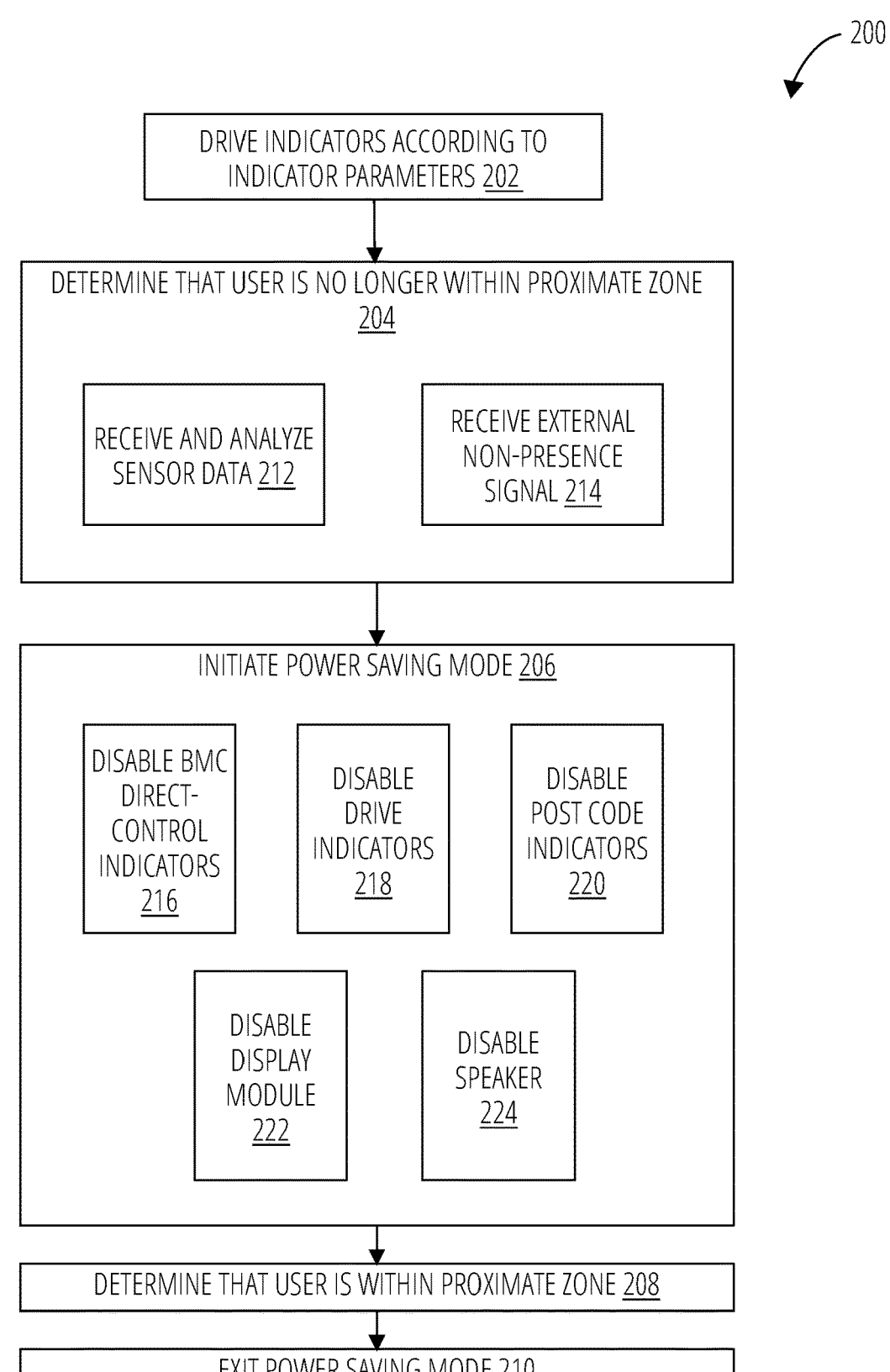

200

DRIVE INDICATORS ACCORDING TO INDICATOR PARAMETERS 202

DETERMINE THAT USER IS NO LONGER WITHIN PROXIMATE ZONE 204

RECEIVE AND ANALYZE SENSOR DATA 212

RECEIVE EXTERNAL NON-PRESENCE SIGNAL 214

INITIATE POWER SAVING MODE 206

DISABLE BMC DIRECT-CONTROL INDICATORS 216

DISABLE DRIVE INDICATORS 218

DISABLE POST CODE INDICATORS 220

DISABLE DISPLAY MODULE 222

DISABLE SPEAKER 224

DETERMINE THAT USER IS WITHIN PROXIMATE ZONE 208

EXIT POWER SAVING MODE 210

FIG. 2

DATA CENTER POWER MANAGEMENT WITH POWER SAVING MODE

The present disclosure relates to computing devices generally and more specifically to managing power usage in data centers.

BACKGROUND

Modern data centers usually include a large number of computing devices, such as servers, network switches, storage devices, and the like. Each of these devices may include output devices, such as lights, speakers, displays, and the like. Keeping these computing devices operational requires substantial power. Improving the power efficiency of computing devices can bring substantial benefits, especially for larger datacenters. For example, small improvements in power efficiency carried across hundreds or thousands of computing devices in a large datacenter can provide significant decreases in overall power usage, significant decreases in operational costs, and significant decreases in power waste (e.g., heat generation).

There is a need for system and techniques for that improve the efficiency of computing devices, especially in datacenters and similar locations having multiple computing devices.

BRIEF SUMMARY

Embodiments of the present disclosure include a system. The system includes one or more indicators coupled to a computing device located in an environment. The system also includes one or more data processors. The system also includes a non-transitory computer-readable storage medium containing instructions which, when executed on the one or more data processors, cause the one or more data processors to perform operations. The operations include driving each indicator of the one or more indicators to indicate a respective state of a respective parameter associated with the respective indicator. The operations further include determining that a user is no longer within a proximate zone. The proximate zone is proximate to the computing device within the environment. The operations further include initiating a power saving mode in response to determining that the user is no longer within the proximate zone. Initiating the power saving mode causes each indicator of the one or more indicators to no longer be driven regardless of the respective state of the respective parameter.

In some cases, the operations further include determining that the user or an additional user is within the proximate zone, and ceasing the power saving mode in response to determining that the user or the additional user is within the proximate zone. Ceasing the power saving mode causes each indicator of the one or more indicators to be driven to indicate the respective state of the respective parameter associated with the respective indicator. In some cases, the computing device further includes at least one drive, where the one or more indicators includes at least one drive indicator associated with the at least one drive, and where initiating the power saving mode includes transmitting a command from a baseboard management controller of the computing device to a backplane controller of the computing device to turn off the at least one drive indicator. In some cases, the one or more indicators includes at least one power-on self-test (POST) code indicator indicative of a received POST code associated with the computing device, and initiating the power saving mode includes ceasing to drive the POST code indicator regardless of the received POST code. In some cases, the computing device further includes a baseboard management controller (BMC), where the one or more indicators includes at least one BMC direct-control indicator, and where initiating the power saving mode includes ceasing to drive the at least one BMC direct-control indicator. In some cases, the one or more data processors includes a baseboard management controller (BMC) of the computing device and an additional processor of the computing device, where determining that the user is no longer within the proximate zone is performed by the BMC, and where initiating the power saving mode includes transmitting a command from the BMC to the additional processor to disable at least one of the one or more indicators. In some cases, the system may also include where determining that the user is no longer within the proximate zone includes receiving sensor data associated with ambient light within the environment, determining that one or more lights in the environment have been turned off based at least in part on the sensor data, and generating an inference that the user is no longer within the proximate zone based on the determination that the one or more lights in the environment have been turned off. In some cases, the system may also include where determining that the user is no longer within the proximate zone includes receiving a non-presence signal from an additional computing device separate from the computing device. In some cases, the system may also include where determining that the user is no longer within the proximate zone includes updating a user-presence flag to indicate that the user is no longer within the proximate zone, and where initiating the power saving mode includes reading the user-presence flag. Other technical features may be readily apparent to one skilled in the art from the following figures, descriptions, and claims.

Embodiments of the present disclosure include a computer-implemented method. The method includes driving, at a computing device having one or more indicators, each indicator of the one or more indicators to indicate a respective state of a respective parameter associated with the respective indicator. The method further includes determining that a user is no longer within a proximate zone. The proximate zone is proximate to the computing device. The computing device is within an environment. The method further includes initiating a power saving mode in response to determining that the user is no longer within the proximate zone. Initiating the power saving mode causes each indicator of the one or more indicators to no longer be driven regardless of the respective state of the respective parameter.

In some cases, the method further includes determining that the user or an additional user is within the proximate zone, and ceasing the power saving mode in response to determining that the user or the additional user is within the proximate zone, where ceasing the power saving mode causes each indicator of the one or more indicators to be driven to indicate the respective state of the respective parameter associated with the respective indicator. In some cases, the computing device includes at least one drive, where the one or more indicators includes at least one drive indicator associated with the at least one drive, and where initiating the power saving mode includes transmitting a command from a baseboard management controller of the computing device to a backplane controller of the computing device to turn off the at least one drive indicator. In some cases, the one or more indicators includes at least one power-on self-test (POST) code indicator indicative of a received POST code associated with the computing device, and where initiating the power saving mode includes ceasing to drive the POST code indicator regardless of the received POST code. In some cases, the computing device includes a baseboard management controller (BMC), where the one or more indicators includes at least one BMC direct-control indicator, and where initiating the power saving mode includes ceasing to drive the at least one BMC direct-control indicator. In some cases, determining that the user is no longer within the proximate zone is performed by a baseboard management controller (BMC) of the computing device, and initiating the power saving mode includes transmitting a command from the BMC to an additional processor of the computing device to disable at least one of the one or more indicators. In some cases, determining that the user is no longer within the proximate zone includes receiving sensor data associated with ambient light within the environment, determining that one or more lights in the environment have been turned off based at least in part on the sensor data, and generating an inference that the user is no longer within the proximate zone based on the determination that the one or more lights in the environment have been turned off. In some cases, determining that the user is no longer within the proximate zone includes receiving a non-presence signal from an additional computing device separate from the computing device. In some cases, determining that the user is no longer within the proximate zone includes updating a user-presence flag to indicate that the user is no longer within the proximate zone, and where initiating the power saving mode includes reading the user-presence flag. In some cases, the additional computing device can monitor an exit from the environment, and the non-presence signal is indicative that the user has exited the environment at the exit.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 is a flowchart depicting a process for saving power, according to certain aspects of the present disclosure.

DETAILED DESCRIPTION

Figure 1:
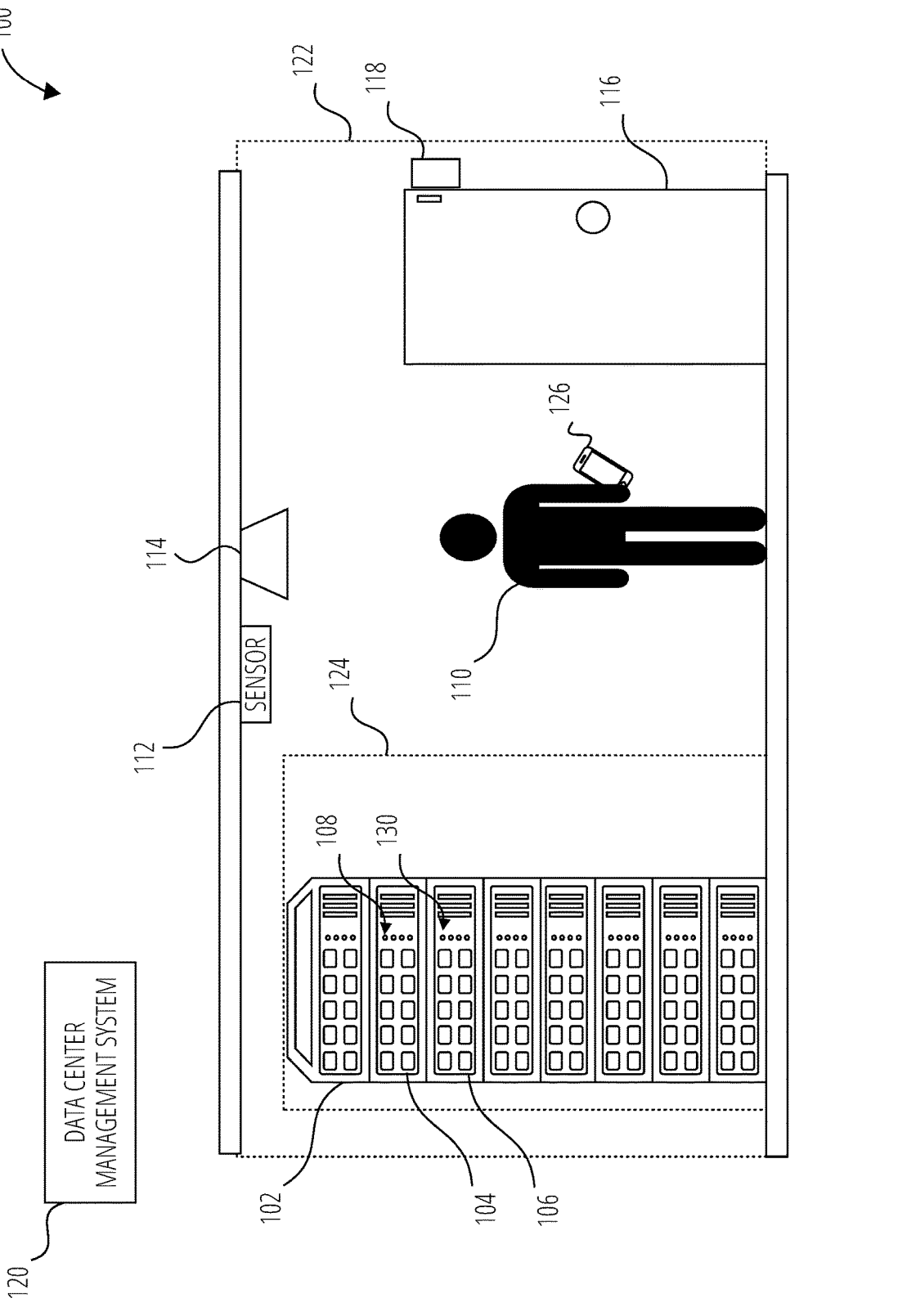
FIG. 1 is a schematic diagram depicting a power-saving computing environment, according to certain aspects of the present disclosure.

A computing system can be controlled to move into and out of a power saving mode based on the detected proximity of a user. When a user is not within a proximate zone of the computing system, the computing system can enter a power saving mode. When in the power saving mode, the various indicators (e.g., visual, auditory, or other) of the computing system, can be temporarily disabled, thus reducing the amount of light, sound, or other energy generated by the computing system. When a user is detected within the proximate zone, the computing device can exit the power saving mode, allowing its various indicators to operate as usual. Thus, while a user is sufficiently proximate to a computing system to receive information from its indicators, the computing system may operate its indicators as usual, but when the user is no longer proximate to the computing system, the computing system can disable its indicators to preserve power.

As used herein, a computing device or computing system can refer to any suitable computing device, such as a personal computer, a server computer, a storage device (e.g., network attached storage), a network switch (e.g., a managed network switch), and the like. Generally, aspects and features of the present disclosure are especially useful when used with computing devices that are designed to be primarily used remotely (e.g., via a network) instead of locally (e.g., via an attached keyboard and mouse).

These computing devices can include many components, including one or more indicators. An indicator is any output device capable of generating a perceivable output signal within the environment in which the computing device is physically located. Indicators can be visual indicators (e.g., light-generating indicators, such as light emitting diodes (LEDs), display screens, monitors, and the like), audio indicators (e.g., speakers, audible haptic feedback devices, and the like), haptic indicators (e.g., vibrating motors, haptic feedback-generating solenoids, and the like), olfactory indicators (e.g., scent-generating devices), and the like. Often, computing devices include multiple visual indicators, such as indicator LEDs for various purposes, such as to indicate power, network connectivity, access, and the like. Indicators can be located in or on a chassis of the computing device, although that need not always be the case.

As used herein, the term user is intended to include any individual who may interact with a computing device in any fashion, including only to perceive an output signal from an indicator (e.g., a user is intended to include an individual who only views an indicator LED on a front panel of a server).

Certain aspects and features of the present disclosure can be especially useful when used with computing devices located in an environment where users are often not present for extended periods of time. For example, large datacenters may include many computing devices located in numerous racks throughout one or more server rooms. The entire datacenter may be operated by a small number of employees, who may spend much of their time outside of the server rooms, only entering to perform occasional maintenance on some servers. Thus, long periods of time may elapse without a user walking by a particular server in the datacenter.

Presently, computing devices will always generate indicator outputs consistent with the state of the system (e.g., illuminating a power LED when powered up, illuminating a drive access light when the drive is being accessed, etc.). Thus, in large datacenters, all computing devices within the system may generate indicator outputs even when no one is around to perceive them.

In some cases, a user may set up a computing device to never generate certain or all indicator outputs, however the user will then lose the ability to glean important information from the computing device's indicators in the future.

Certain aspects of the present disclosure permit computing devices to intelligently move into or out of a power saving mode, in which some or all of the indicators are bypassed or disabled, thus ceasing the generation of indicator outputs when they are not needed and automatically resuming generation of indicator outputs when they would be helpful.

Certain aspects of the present disclosure can be implemented via a looping task performed by a baseboard management controller (BMC). This looping task can check to determine whether or not a power saving flag is enabled or disabled (e.g., whether a particular bit in memory is a "1" or a "0"). If the BMC detects that the power saving flag is enabled (or moves from disabled to enabled), it will cause the desired indicator(s) to be bypassed or disabled. If the BMC detects that the power saving flag is disabled (or moves from enabled to disabled), it will cause the desired indicator(s) to be re-enabled or otherwise perform as usual.

Separately, the BMC or another processor can act to set the power saving flag to enabled when user proximity is not detected and disabled when user proximity is detected. Thus, when a user is not detected near the computing device, its power saving flag will be enabled and the BMC will see that change of the power saving flag and bypass or disable the desired indicators. Likewise, when a user is detected near the computing device, its power saving flag will be disabled, and the BMC will see that change of the power saving flag and re-enable (or cease bypassing) the desired indicators.

While described with reference to a power saving flag, in some cases a user-presence flag can be used in addition or instead of the power saving flag. In such cases, the user-presence flag is opposite of the power saving flag, such that the user-presence flag being set to true (e.g., a user is present in the proximate zone) is equivalent to the power saving flag being set to disabled, and the user-presence flag being set to false (e.g., a user is not present in the proximate zone) is equivalent to the power saving flag being set to enabled. Thus, a user-presence flag and a power saving flag can effectively be functional equivalents of one another.

As used herein, the term "proximate zone" is intended to describe an area or volume of space in which the presence or absence of a user is desired to affect a computing device's power saving mode as disclosed herein. In some cases, the proximate zone can be relatively large (e.g., a building, a floor of a building, a room), in which case the presence of a user within the building may be sufficient to cease power-saving of any computing devices in the building. Such large proximate zones may be especially useful if indicators can be perceived from far away, such as if a user in one room may be able to see indicator LEDs on servers in multiple rooms at the same time (e.g., through glass walls or windows). In some cases, proximate zones can be relatively small, such as within a close proximity to a computing device being controlled (e.g., within 1-3 feet of the computing device).

In some cases, multiple computing devices can share a common proximate zone, although that need not always be the case. For example, in some cases, the proximate zones for each computing device can be based on where a user is expected to be able to perceive the indicators on that device. In such an example, a proximate zone for a first computing device located in the middle of an aisle of server racks may extend only a few feet on either side of the computing device, whereas a proximate zone for a second computing device located at the end of an aisle of server racks that faces a window into an adjacent room may extend well past the end of the aisle and even into the adjacent room. In some cases, proximate zones can be defined to include buffer regions, which can be an additional region designed to account for any delay between the user entering the proximate zone and the indicators generating outputs again. For example, a proximate zone that extends down an aisle may further include a buffer region that extends a short distance around the corner at the end of the aisle such that a user walking to the aisle will enter the buffer zone of the proximate zone and cause the indicator lights to be begin being re-enabled such that they are generating indicator outputs by the time the user turns into the aisle.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting a power-saving computing environment 100, according to certain aspects of the present disclosure. The computing environment 100 can be any suitable environment, although depicted in FIG. 1 as a datacenter. The computing environment 100 can include a room containing a server rack 102 containing multiple computing devices (e.g., servers). For example, server rack 102 includes at least a first server 104 and a second server 106. The first server 104 includes first indicators 108 and the second server 106 includes second indicators 130. The first indicators 108 and second indicators 130 can be any suitable indicators, such as indicator LEDs.

The server rack 102 may be located within a room accessible by a door 116. A user 110 can enter the room to view the server rack 102 and servers (or other computing devices) installed thereon. The first server 104 and the second server 106 can each operate with a power saving mode enabled or disabled. When the power saving mode is enabled, the respective indicators 108, 130 will be bypassed or disabled, and thus not illuminate (or otherwise generate indicator output). When the power saving mode is disabled, the respective indicators 108, 130 will revert to generating appropriate indicator output.

The first server 104 and second server 106 can be put into power saving modes individually or together. A computing device can be put into a power saving mode by a processor within the computing device itself, or by an external device. In one example, first server 104 may include a BMC that monitors a sensor (e.g., a sensor built into the first server 104 or server rack 102, or another sensor, such as sensor 112 described in further detail herein) to determine when a user 110 is sufficiently proximate the first server 104 to disable the power saving mode or when a user 110 is sufficiently distant the first server 104 to enable the power saving mode. In another example, second server 106 may enable or disable its power saving mode based on a communication sent from an external device, such as the first server 104, a data center management system 120, or a mobile device 126 of the user 110. In such a case, the external device may monitor the sensor(s) or may otherwise determine when to enabled or disable the power saving mode of second server 106, and then send the communication to the second server 106 appropriately.

The determination about whether or not to enable or disable a power saving mode can be based on whether or not a user 110 is determined to be within a proximate zone, such as within the first proximate zone 122 or the second proximate zone 124. The first proximate zone 122 represents the room in which the server rack 102 is located, such that the power saving mode of the first server 104 and/or the second server 106 may be disabled when the user 110 enters the room. The second proximate zone 124 represents a region near the server rack 102, but not extending throughout the entire room. Any other suitable size proximate zone may be used.

The determination about whether or not a user 110 is within a proximate zone 122, 124 can be based on sensor data from any suitable sensor. In an example, a proximity/presence sensor (e.g., passive infrared sensor, millimeter wave sensor or other radiofrequency sensor) can output a signal indicative of the presence of a user 110 within its range. For example, an external sensor 112 can be positioned in a room to detect when a user 110 is present. One or more sensors can be used to detect when a user 110 has entered any portion of a proximate zone. In another example, a camera feed can be analyzed to identify when a user 110 enters a proximate zone. In another example, for a proximate zone (e.g., first proximate zone 122) with a specific set of entry points, these entry points can be monitored to identify when a user 110 has entered and exited the proximate zone. For example, the first proximate zone 122 may have a single door 116 as the only entry/exit point to the room. In such an example, a door sensor 118 can detect when the door is opened. When the room is empty, opening of the door as detected by the door sensor 118 may be inferred to indicate that a user 110 has entered the first proximate zone 122.

In another example, a light sensor located on or near a computing device can be used to determine when the lights in a room have been turned on, in which case the computing device may infer that a user 110 is present if the lights are turned on, but no user 110 is present if the lights are turned off.

In another example, a location sensor (e.g., a global positioning satellite (GPS) sensor, a set of wireless sensors used in triangulation or signal strength detection, or the like) positioned on the user 110 or held by the user 110 (e.g., incorporated into a mobile device 126) can be used to identify the location of the user 110. Based on this identified location, a determination can be made as to whether or not the user 110 is within the proximate zone.

In some cases, an action taken by user 110 can be used to infer that the user 110 is in a proximate zone simply because the action would not be able to be otherwise taken if the user 110 were not in the proximate zone. For example, a user 110 pressing a physical button on the first server 104 may be used to infer that the user 110 is within the second proximate zone 124, since the user 110 would not otherwise be able to press the physical button. As another example, a user 110 may scan (e.g., using a mobile device 126) a barcode, quick reference (QR) code, or other identifier located at or near the first server 104. Upon making this scan, a determination can be made that the user 110 must be within the second proximate zone 124. While some of these examples are described as a user 110 taking an action that can be used to infer that the user 110 is in a proximate zone, in some cases such an action taken by a user 110 can simply trigger a computing device to exit a power saving mode without necessarily making an inference as to the location of the user 110.

In some cases, determining that a user 110 is present within or absent from a proximate zone can be used to turn on or turn off, respectively, lights or other fixtures in or near the proximate zone. For example, upon detecting that the user 110 has entered the first proximate zone 122, the first server 104 and second server 106 can be triggered to exit their power saving modes, and a set of overhead lights 114 can be turned on to illuminate the first proximate zone 122.

Detection of a user 110, determination of whether the user 110 is within a proximate zone (e.g., the first proximate zone 122 or the second proximate zone 124), and/or triggering a computing device (e.g., the first server 104 or second server 106) to enter or exit a power saving mode can be performed by any suitable computing device. In some cases, each computing device can perform its own actions to control its own power saving mode. For example, the first server 104 may include its own sensor or may receive sensor data from an external sensor 112, and may use its own BMC to determine the presence of a user 110 within the second proximate zone 124 from this sensor data and then enter or exit its own power saving mode accordingly.

In some cases, however, the aforementioned actions can be performed by a separate computing device, such as a mobile device 126 and/or a data center management system 120. A mobile device 126 can be any suitable device, such as a smartphone, a tablet, a portable computer, a smartwatch or other wearable device, or the like. A user 110 can carry the mobile device 126, which can make a determination about what computing devices should enter or exit power saving modes based on its own identified location with respect to those computing devices. For example, the mobile device 126 can progressively send signals to computing devices in adjacent server racks along an aisle to exit power saving modes as the user 110 walks along the aisle and nears those computing devices. A data center management system 120 can be a set of one or more computing devices designed to manage various functions of the data center. In some cases, a data center management system 120 can make determinations about when certain computing devices in the data center should enter or exit power saving modes, such as based on the detected location of users 110 within the data center.

In some cases, a user 110 can manually initiate a command to cause a computing device to enter or exit a power saving mode, such as via a user interface on a data center management system 120, via a user interface on a mobile device 126, or via a physical button or other input device on a computing device (e.g., first server 104) itself for which the power saving mode is being controlled.

FIG. 2 is a flowchart depicting a process 200 for saving power, according to certain aspects of the present disclosure. Process 200 can be performed using any suitable computing device, such as the first server 104 or second server 106 of FIG. 1. Often, some or all blocks of process 200 can be performed by a BMC of the computing device.

At block 202, indicators (e.g., visual indicators, audio indicators, or the like) can be driven according to indicator parameters. An indicator parameter is a parameter denoting how a given indicator should be driven to generate the appropriate indicator output at that time. For example, while a motherboard is being supplied power, an indicator parameter associated with the power LED may have a state of "on", thus representing that the power LED should be driven to illuminate, whereas once power is no longer supplied to the motherboard, the indicator parameter associated with the power LED may have a state of "off," thus representing that the power LED should not be driven to illuminate. As used herein, the term indicator parameter and its state are intended to represent a conceptual parameter, whether or not the parameter is actually stored in memory anywhere.

Driving the indicators at block 202 includes allowing any components of the computing device that normally drive a given indicator to drive that indicator as usual.

At block 204, a determination is made that a user is no longer within the proximate zone. Making the determination at block 204 can include determining that a specific user, a set of specific users, or all users are not within the proximate zone. Making the determination at block 204 can occur as described in further detail herein.

In some cases, making the determination at block 204 can include receiving and analyzing sensor data at block 212. For example, sensor data from a presence sensor can be used to determine when presence of a user is no longer detected. As another example, sensor data from a Bluetooth or other wireless signal strength sensor can be used to determine when a user's mobile device is further than a threshold distance away from the sensor. Any other suitable sensor and sensor data can be used to determine that the user is no longer within a proximate zone.

In some cases, making the determination at block 204 can include receiving an external non-presence signal at block 214. Receiving an external non-presence signal can include receiving a signal from another computing device, such as from another computing device for which a power saving mode is controlled, from a user's mobile device, or from a data center management system. Such a signal can be indicative that the user is no longer present within the proximate zone. For example, a data center management system can determine that all users have exited a particular room in the data center, in which case the data center management system can send a non-presence signal to all computing devices within that room indicating that no users are present within the proximate zone defined by the room (or any proximate zones within the room).

At block 206, a power saving mode is initiated. Initiating the power saving mode at block 206 can result in each desired indicator (e.g., one, some, or all indicators) of the computing device being bypassed or disabled, such that they no longer generate indicator output. A variety of approaches can be used to bypass or disable indicators.

In some cases, initiating the power saving mode at block 206 can include disabling BMC direct-control indicators at block 216. BMC direct-control indicators are those indicators that are directly controlled by the BMC itself, such as certain LEDs used to indicate system power status, fault events, identification, BMC heartbeat, and system power-on self-test (POST) codes. In some cases, BMC firmware can be updated to provide for this functionality to cease driving direct-control indicators when in a power saving mode.

In some cases, initiating the power saving mode at block 206 can include disabling drive indicators at block 218. Disabling drive indicators at block 218 can include sending a signal to a controller (e.g., a redundant array of independent disks (RAID) or host-bus adaptor (HBA) controller, or a baseboard management controller) to override the indicators associated with the drives (e.g., solid state drives, hard disk drives, and the like) associated with that controller. In some cases, firmware for the controller may be updated to provide for this functionality to cease driving indicators in response to an appropriate signal (e.g., from the BMC).

In some cases, initiating the power saving mode at block 206 can include disabling POST code indicators at block 220. In some cases, disabling POST code indicators at block 220 can be performed as part of block 216, although that need not always be the case. In some cases, disabling POST code indicators at block 220 can include overriding a POST code being output from the system and/or simply causing the POST code to be ignored while the power saving mode is active.

In some cases, initiating the power saving mode at block 206 can include disabling a display module at block 222. Display modules can be used to display information that may not be suitable for display using individual LEDs or other indicators. For example, a display module may be a liquid crystal display device that is incorporated into a server to display certain useful information, such as uptime, temperature, internet protocol (IP) address, and the like. In some cases, disabling the display module at block 222 can include ceasing to drive the display module, causing the display module to be driven without backlighting or other power-expensive functions, or temporarily cutting power to the display module altogether.

In some cases, initiating the power saving mode at block 206 can include disabling a speaker at block 224. Speakers can be used to generate audio output that can be perceived by a user 110, such as to ascertain certain server status information by voice (e.g., via synthesized text to speech). Disabling the speaker at block 224 can include ceasing to drive the speaker, ceasing to provide adequate power to the speaker (e.g., ceasing to provide power to an audio amplifier circuit), or the like.

While in the power saving mode, the computing device can continue to operate as usual, except for the generation of indicator outputs, which has been ceased.

In some cases, process 200 can continue at block 208 by determining that a user is within the proximate zone. Determining that a user is within the proximate zone at block 208 can occur similarly to determining that a user is not within the proximate zone at block 204, but with an opposite determination. For example, the same sensor data from block 212 can be received and analyzed to determine that the user is present. As another example, instead of receiving an external non-presence signal at block 214, an external presence signal can be received.

At block 210, in response to determining that the user is within the proximate zone, the power saving mode can be exited. Exiting the power saving mode can occur similarly to initiating the power saving mode at block 206, but with an opposite result. For example, instead of disabling BMC direct-control indicators at block 216, those same indicators can be re-enabled. Likewise, drive indicators can be re-enabled, POST code indicators can be re-enabled, display modules can be re-enabled, and/or speakers can be re-enabled.

While process 200 is depicted with certain blocks in a certain order, in some cases process 200 can occur with fewer blocks, more blocks, and/or different blocks, including in different orders.

Figure 3:
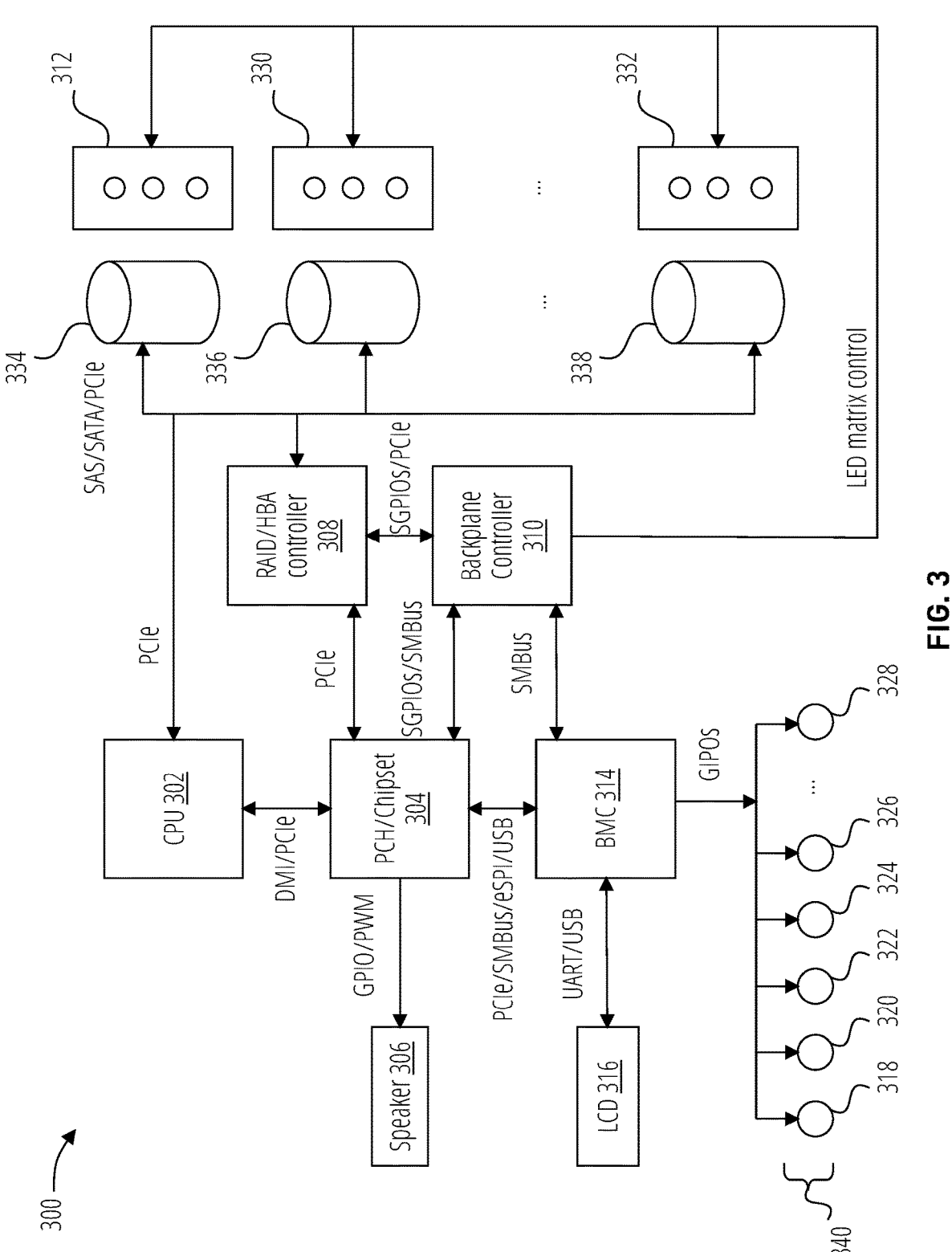
FIG. 3 is a schematic diagram depicting a computing system capable of power saving, according to certain aspects of the present disclosure.

FIG. 3 is a schematic diagram depicting a computing system 300 capable of power saving, according to certain aspects of the present disclosure. Computing system 300 can be the first server 104 or the second server 106 of FIG. 1. While described with certain components connected in a certain fashion in FIG. 3, in some cases a computing system 300 can be provided with different components and connected in alternate fashions.

Various busses and interfaces can be used to connect together different components, such as peripheral component interconnect express (PCIe), direct media interface (DMI), inter-integrated circuit (I2C), improved inter-integrated circuit (I3C), system management bus (SMBus), serial general purpose input output (SGPIO), general purpose input output (GPIO), universal serial bus (USB), enhanced serial peripheral interface (eSPI), serial advanced technology attachment (SATA), serial attached SCSI (SAS), universal asynchronous receiver/transmitter (UART), pulse width modulation (PWM), and the like.

The computing system 300 can include a central processing unit (CPU) 302, which can perform certain major functions, such as operating the operating system. The CPU 302 can be coupled (e.g., via a DMI/PCIe connection) to a platform controller hub (PCH) or similar chipset 304, which can control certain additional functions to support the CPU 302. In some cases, however computing system 300 may not include a PCH/Chipset 304 and instead the CPU 302 can perform the functions of the PCH/Chipset 304.

The PCH/Chipset 304 can be coupled to a speaker 306 to generate audio indicator output, such as via a GPIO/PWM connection.

The PCH/Chipset 304 can be coupled to a BMC 314 (e.g., via a PCIe/SMBus/eSPI/USB connection). The BMC 314 can perform various support functions for the computing system 300, such as powering on and monitoring other components of the computing system 300. In some cases, the BMC 314 can monitor whether or not the computing system 300 should be in a power saving mode, and if it is determined that the computing system 300 should be in a power saving mode, control the indicators to be disabled or bypassed.

The BMC 314 itself can be coupled to a liquid crystal display (LCD) 316, such as via a UART/USB connection. The BMC 314 can also drive a set of system indicators 340 (e.g., via GPIO connections), which can include a power LED 318, a fault LED 320, an identification (ID) LED 322, a heartbeat LED 324, a POST-0 LED 326, and any number of additional POST LEDs up to POST-n LED 328.

The computing system 300 may include one or more drives (e.g., SSD-A 334, SSD-B 336, and any number of additional drives up to SSD-n 338). Each of these drives can have an associated LED matrix (e.g., LED matrix-A 312, LED matrix-B 330, up to LED matrix-n 332). The CPU 302 can be coupled to these drives, such as via a PCIe connection. These drives can also be coupled to a RAID/HBA controller 308, such as via an SAS/SATA/PCIe connection. The RAID/HBA controller 308 can be coupled to PCH/Chipset 304, such as via a PCIe connection. The RAID/HBA controller 308 can be coupled to a backplane controller 310, such as via SGPIOs/PCIe connection(s). The backplane controller 310 itself can be coupled to the PCH/Chipset 304, such as via SGPIOs/SMBus connections. The backplane controller 310 can also be coupled to BMC 314, such as via a SMBus connection. The backplane controller 310 can, among other functions, control the LED matrices 312, 330, 332 to illuminate as appropriate based on the state/usage of the respective drives 334, 336, 338.

The BMC 314 can continuously check to see if the computing system 300 should be in a power saving mode. If it is determined that the computing system 300 should be in a power saving mode, the BMC 314 can take various actions to effect the power saving mode.

The BMC 314 can disable its own GPIO pins (or simply cease driving them) to disable the various system indicators 340 that are directly controlled by the BMC 314. In some cases, the BMC 314 can optionally override any POST codes being sent from the system host (e.g., the CPU 302 and/or PCH/Chipset 304).

The BMC 314 can either control LCD 316 to not be driven or be driven without a backlight or certain other power-hungry functions, or can simply cut power to the LCD 316 (e.g., by cutting power to the associated UART/USB port).

The BMC 314 can disable speaker 306 by sending a command to PCH/Chipset 304 (and/or CPU 302) to cease driving the speaker 306. In some cases, firmware for the PCH/Chipset 304 (and/or CPU 302) can be updated to respond to such a command by disabling the speaker 306.

The BMC 314 can send a command to the backplane controller 310 to cease driving all of the indicators associated with the drives (e.g., to turn off LED matrix-A 312, LED matrix-B 330, and any others up to LED matrix-n 332).

If the BMC 314 is operating in a power saving mode and determines that the power saving mode should be exited, the BMC 314 can revert the changes described above. For example, the BMC 314 can re-enable its own GPIO pins, can cease overriding POST codes, can control LCD 316 as normal, can send a command to the PCH/Chipset 304 (and/or CPU 302) to drive the speaker 306 as normal, and/or can send a command to the backplane controller 310 to drive the drive indicators as normal.

Figure 4:
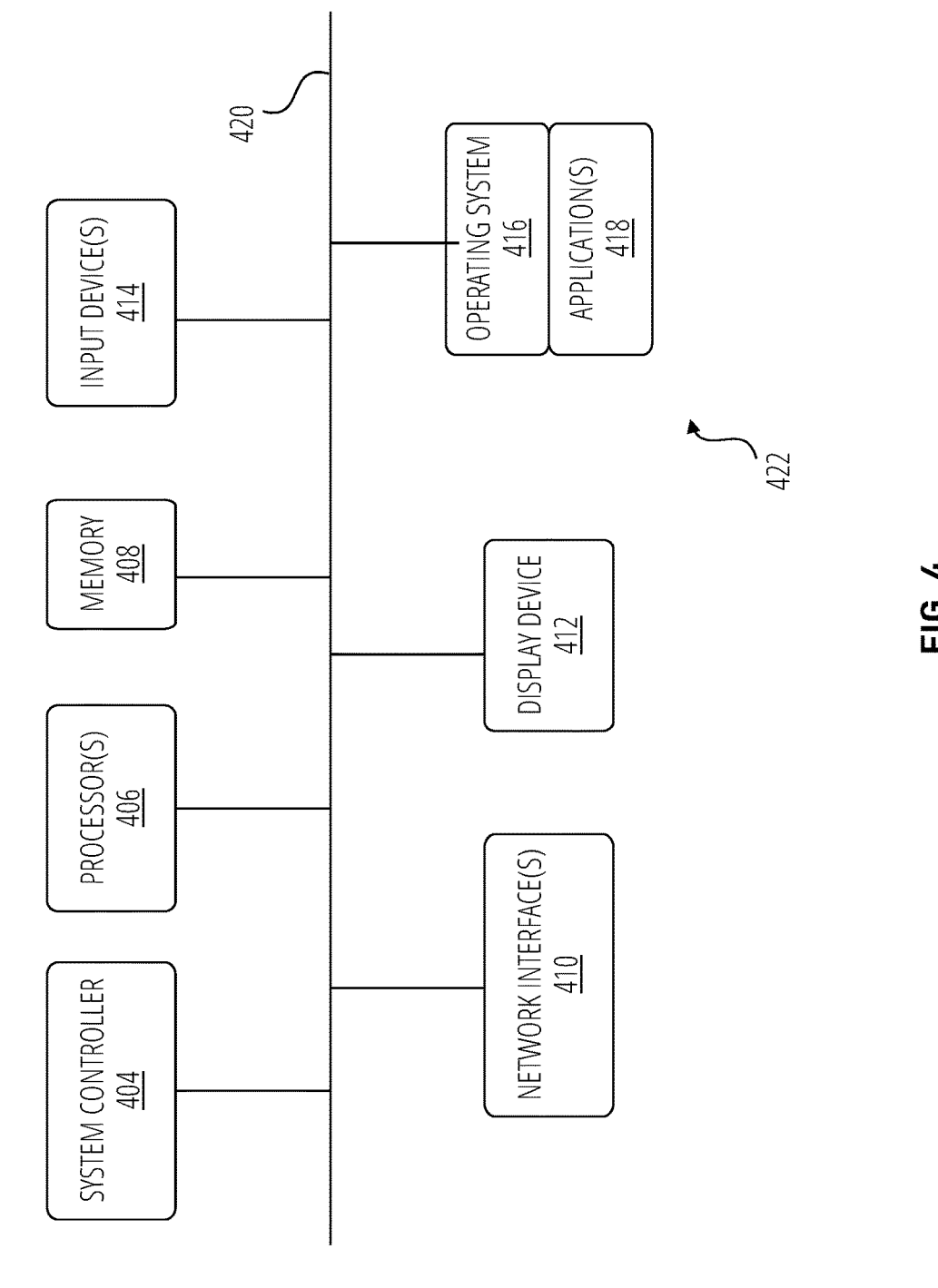
FIG. 4 is a block diagram of an example system architecture for implementing features and processes of the present disclosure.

FIG. 4 is a block diagram of an example system architecture 402 for implementing features and processes of the present disclosure, such as those presented with reference to process 200 of FIG. 2. The features and processes disclosed herein can be implemented using one or multiple instances of system architecture 402. The system architecture 402 can be used to implement a server (e.g., a cloud-accessible server), a user device (e.g., a smartphone or personal computer), or any other suitable device for performing some or all of the aspects of the present disclosure. The system architecture 402 can be implemented on any electronic device that runs software applications derived from compiled instructions, including without limitation personal computers, servers, smart phones, electronic tablets, game consoles, email devices, and the like. In some implementations, the system architecture 402 can include one or more processors 406, one or more input devices 414, one or more display devices 412, one or more network interfaces 410, and one or more computer-readable media 422. Each of these components can be coupled by bus 420.

Display device 412 can be any known display technology, including but not limited to display devices using Liquid Crystal Display (LCD) or Light Emitting Diode (LED) technology. Processor(s) 406 can use any known processor technology, including but not limited to graphics processors and multi-core processors. Input device 414 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 420 can be any known internal or external bus technology, including but not limited to ISA, EISA, PCI, PCI Express, NuBus, USB, Serial ATA or FireWire.

Computer-readable medium 422 can be any medium that participates in providing instructions to processor 406 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 422 can include various instructions for implementing operating system 416 and applications 418 such as computer programs. The operating system 416 can be multi-user, multiprocessing, multitasking, multithreading, real-time and the like. The operating system 416 performs basic tasks, including but not limited to: recognizing input from input device 414; sending output to display device 412; keeping track of files and directories on computer-readable medium 422; controlling peripheral devices (e.g., storage drives, interface devices, etc.) which can be controlled directly or through an I/O controller; and managing traffic on bus 420. Computer-readable medium 422 can include various instructions for implementing firmware processes, such as a BIOS. Computer-readable medium 422 can include various instructions for implementing any of the processes described herein, including at least process 200 of FIG. 2.

Memory 408 can include high-speed random access memory and/or non-volatile memory, such as one or more magnetic disk storage devices, one or more optical storage devices, and/or flash memory (e.g., NAND, NOR). The memory 408 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 408 can store an operating system, such as Darwin, RTXC, LINUX, UNIX, OS X, WINDOWS, or an embedded operating system such as VxWorks.

System controller 404 can be a service processor that operates independently of processor 406. In some implementations, system controller 404 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

One or more elements or aspects or steps, or any portion(s) thereof, from one or more of any of the claims below can be combined with one or more elements or aspects or steps, or any portion(s) thereof, from one or more of any of the other claims below or combinations thereof, to form one or more additional implementations and/or claims of the present disclosure.

What is claimed is:

1. A system, comprising:
   one or more indicators coupled to a computing device located in an environment;
   one or more data processors; and
   a non-transitory computer-readable storage medium containing instructions which, when executed on the one or more data processors, cause the one or more data processors to perform operations including:
      driving each indicator of the one or more indicators to indicate a respective state of a respective parameter associated with the respective indicator;
      determining that a user is no longer within a proximate zone, the proximate zone being proximate to the computing device within the environment;
      initiating a power saving mode in response to determining that the user is no longer within the proximate zone, wherein initiating the power saving mode causes each indicator of the one or more indicators to no longer be driven regardless of the respective state of the respective parameter;
   wherein the one or more indicators include at least one power-on self-test (POST) code indicator indicative of a received POST code associated with the computing device, and wherein initiating the power saving mode includes ceasing to drive the POST code indicator regardless of the received POST code.

2. The system of claim 1, wherein the operations further include:
   determining that the user or an additional user is within the proximate zone; and
   ceasing the power saving mode in response to determining that the user or the additional user is within the proximate zone, wherein ceasing the power saving mode causes each indicator of the one or more indicators to be driven to indicate the respective state of the respective parameter associated with the respective indicator.

3. The system of claim 1, wherein the computing device includes at least one drive, wherein the one or more indicators includes at least one drive indicator associated with the at least one drive, and wherein initiating the power saving mode includes transmitting a command from a baseboard management controller of the computing device to a backplane controller of the computing device to turn off the at least one drive indicator.

4. The system of claim 1, wherein the computing device includes a baseboard management controller (BMC), wherein the one or more indicators includes at least one BMC direct-control indicator, and wherein initiating the power saving mode includes ceasing to drive the at least one BMC direct-control indicator.

5. The system of claim 1, wherein the one or more data processors includes a baseboard management controller (BMC) of the computing device and an additional processor of the computing device, wherein determining that the user is no longer within the proximate zone is performed by the BMC, and wherein initiating the power saving mode includes transmitting a command from the BMC to the additional processor to disable at least one of the one or more indicators.

6. The system of claim 1, wherein determining that the user is no longer within the proximate zone includes:
   receiving sensor data associated with ambient light within the environment;
   determining that one or more lights in the environment have been turned off based at least in part on the sensor data; and
   generating an inference that the user is no longer within the proximate zone based on the determination that the one or more lights in the environment have been turned off.

7. The system of claim 1, wherein determining that the user is no longer within the proximate zone includes receiving a non-presence signal from an additional computing device separate from the computing device.

8. The system of claim 1, wherein determining that the user is no longer within the proximate zone includes updating a user-presence flag to indicate that the user is no longer within the proximate zone, and wherein initiating the power saving mode includes reading the user-presence flag.

9. The system of claim 7, wherein the additional computing device monitors an exit from the environment, and wherein the non-presence signal is indicative that the user has exited the environment at the exit.

10. A computer-implemented method, comprising:
   driving, at a computing device having one or more indicators, each indicator of the one or more indicators to indicate a respective state of a respective parameter associated with the respective indicator;
   determining that a user is no longer within a proximate zone, the proximate zone being proximate to the computing device, the computing device being within an environment; and
   initiating a power saving mode in response to determining that the user is no longer within the proximate zone, wherein initiating the power saving mode causes each indicator of the one or more indicators to no longer be driven regardless of the respective state of the respective parameter;
   wherein the one or more indicators includes at least one power-on self-test (POST) code indicator indicative of a received POST code associated with the computing device, and wherein initiating the power saving mode includes ceasing to drive the POST code indicator regardless of the received POST code.

11. The computer-implemented method of claim 10, further comprising:
   determining that the user or an additional user is within the proximate zone; and
   ceasing the power saving mode in response to determining that the user or the additional user is within the proximate zone, wherein ceasing the power saving mode causes each indicator of the one or more indicators to be driven to indicate the respective state of the respective parameter associated with the respective indicator.

12. The computer-implemented method of claim 10, wherein the computing device includes at least one drive, wherein the one or more indicators includes at least one drive indicator associated with the at least one drive, and wherein initiating the power saving mode includes transmitting a command from a baseboard management controller of the computing device to a backplane controller of the computing device to turn off the at least one drive indicator.

13. The computer-implemented method of claim 10, wherein the computing device includes a baseboard management controller (BMC), wherein the one or more indicators includes at least one BMC direct-control indicator, and wherein initiating the power saving mode includes ceasing to drive the at least one BMC direct-control indicator.

14. The computer-implemented method of claim 10, wherein determining that the user is no longer within the proximate zone is performed by a baseboard management controller (BMC) of the computing device, and wherein initiating the power saving mode includes transmitting a command from the BMC to an additional processor of the computing device to disable at least one of the one or more indicators.

15. The computer-implemented method of claim 10, wherein determining that the user is no longer within the proximate zone includes:

receiving sensor data associated with ambient light within the environment;

determining that one or more lights in the environment have been turned off based at least in part on the sensor data; and generating an inference that the user is no longer within the proximate zone based on the determination that the one or more lights in the environment have been turned off.

16. The computer-implemented method of claim 10, wherein determining that the user is no longer within the proximate zone includes receiving a non-presence signal from an additional computing device separate from the computing device.

17. The computer-implemented method of claim 10, wherein determining that the user is no longer within the proximate zone includes updating a user-presence flag to indicate that the user is no longer within the proximate zone, and wherein initiating the power saving mode includes reading the user-presence flag.

18. The computer-implemented method of claim 16, wherein the additional computing device monitors an exit from the environment, and wherein the non-presence signal is indicative that the user has exited the environment at the exit.

19. A system, comprising:

one or more indicators coupled to a computing device located in an environment;

one or more data processors; and a non-transitory computer-readable storage medium containing instructions which, when executed on the one or more data processors, cause the one or more data processors to perform operations including:

driving each indicator of the one or more indicators to indicate a respective state of a respective parameter associated with the respective indicator;

determining that a user is no longer within a proximate zone, the proximate zone being proximate to the computing device within the environment;

initiating a power saving mode in response to determining that the user is no longer within the proximate zone, wherein initiating the power saving mode causes each indicator of the one or more indicators to no longer be driven regardless of the respective state of the respective parameter;

wherein the one or more data processors includes a baseboard management controller (BMC) of the computing device and an additional processor of the computing device, wherein determining that the user is no longer within the proximate zone is performed by the BMC, and wherein initiating the power saving mode includes transmitting a command from the BMC to the additional processor to disable at least one of the one or more indicators.

20. A system, comprising:

one or more indicators coupled to a computing device located in an environment;

one or more data processors; and a non-transitory computer-readable storage medium containing instructions which, when executed on the one or more data processors, cause the one or more data processors to perform operations including:

driving each indicator of the one or more indicators to indicate a respective state of a respective parameter associated with the respective indicator;

determining that a user is no longer within a proximate zone, the proximate zone being proximate to the computing device within the environment;

initiating a power saving mode in response to determining that the user is no longer within the proximate zone, wherein initiating the power saving mode causes each indicator of the one or more indicators to no longer be driven regardless of the respective state of the respective parameter;

wherein determining that the user is no longer within the proximate zone includes:

receiving sensor data associated with ambient light within the environment;

determining that one or more lights in the environment have been turned off based at least in part on the sensor data; and generating an inference that the user is no longer within the proximate zone based on the determination that the one or more lights in the environment have been turned off.

21. A computer-implemented method, comprising:

driving, at a computing device having one or more indicators, each indicator of the one or more indicators to indicate a respective state of a respective parameter associated with the respective indicator;

determining that a user is no longer within a proximate zone, the proximate zone being proximate to the computing device, the computing device being within an environment; and initiating a power saving mode in response to determining that the user is no longer within the proximate zone, wherein initiating the power saving mode causes each indicator of the one or more indicators to no longer be driven regardless of the respective state of the respective parameter;

wherein determining that the user is no longer within the proximate zone is performed by a baseboard management controller (BMC) of the computing device, and wherein initiating the power saving mode includes transmitting a command from the BMC to an additional processor of the computing device to disable at least one of the one or more indicators.

22. A computer-implemented method, comprising:

driving, at a computing device having one or more indicators, each indicator of the one or more indicators to indicate a respective state of a respective parameter associated with the respective indicator;

determining that a user is no longer within a proximate zone, the proximate zone being proximate to the computing device, the computing device being within an environment; and initiating a power saving mode in response to determining that the user is no longer within the proximate zone, wherein initiating the power saving mode causes each indicator of the one or more indicators to no longer be driven regardless of the respective state of the respective parameter;

wherein determining that the user is no longer within the proximate zone includes:

receiving sensor data associated with ambient light within the environment;

determining that one or more lights in the environment have been turned off based at least in part on the sensor data; and generating an inference that the user is no longer within the proximate zone based on the determination that the one or more lights in the environment have been turned off.

\* \* \* \* \*